United States Patent [19]

Johnson

[11] 4,133,543

[45] Jan. 9, 1979

[54] CHUCK KEY

[75] Inventor: Henry B. Johnson, Fayetteville, N.C.

[73] Assignee: The Black and Decker Manufacturing Company, Towson, Md.

[21] Appl. No.: 829,448

[22] Filed: Aug. 31, 1977

[51] Int. Cl.² ............................................. B25B 13/44
[52] U.S. Cl. .................................. 279/1 K; 81/90 A
[58] Field of Search ...................... 408/241; 279/1 K; 81/90 R, 90 A, 90 B, 90 C, 90 D, 90 E, 71; 310/50

[56]  References Cited

U.S. PATENT DOCUMENTS

| 2,257,559 | 9/1941 | Albertson | 279/1 K |
| 2,941,426 | 6/1960 | Mueller et al. | 408/241 |
| 3,213,720 | 10/1965 | Wallis et al. | 81/90 R |

FOREIGN PATENT DOCUMENTS

| 856223 | 12/1960 | United Kingdom | 81/71 |
| 1396859 | 6/1975 | United Kingdom | 279/1 K |

*Primary Examiner*—Gil Weidenfeld
*Attorney, Agent, or Firm*—Edward D. Murphy; Leonard Bloom; Walter Ottesen

[57] ABSTRACT

A portable electric drill is disclosed which includes a loss-proof chuck key. The drill includes a cord set and the chuck key includes a simple, rod-like handle which is shaped to form a closed loop. The loop is slightly larger than the diameter of the cord set but sufficiently smaller than the cross sectional dimensions of the plug so that the key cannot be slipped off over the plug. In a preferred embodiment, the key comprises a triangular handle to provide a good gripping surface for the user. Other accessory hand tools for use with electric or pneumatic power tools attached to the power tool in a similar manner are also disclosed.

6 Claims, 5 Drawing Figures

U.S. Patent        Jan. 9, 1979        4,133,543
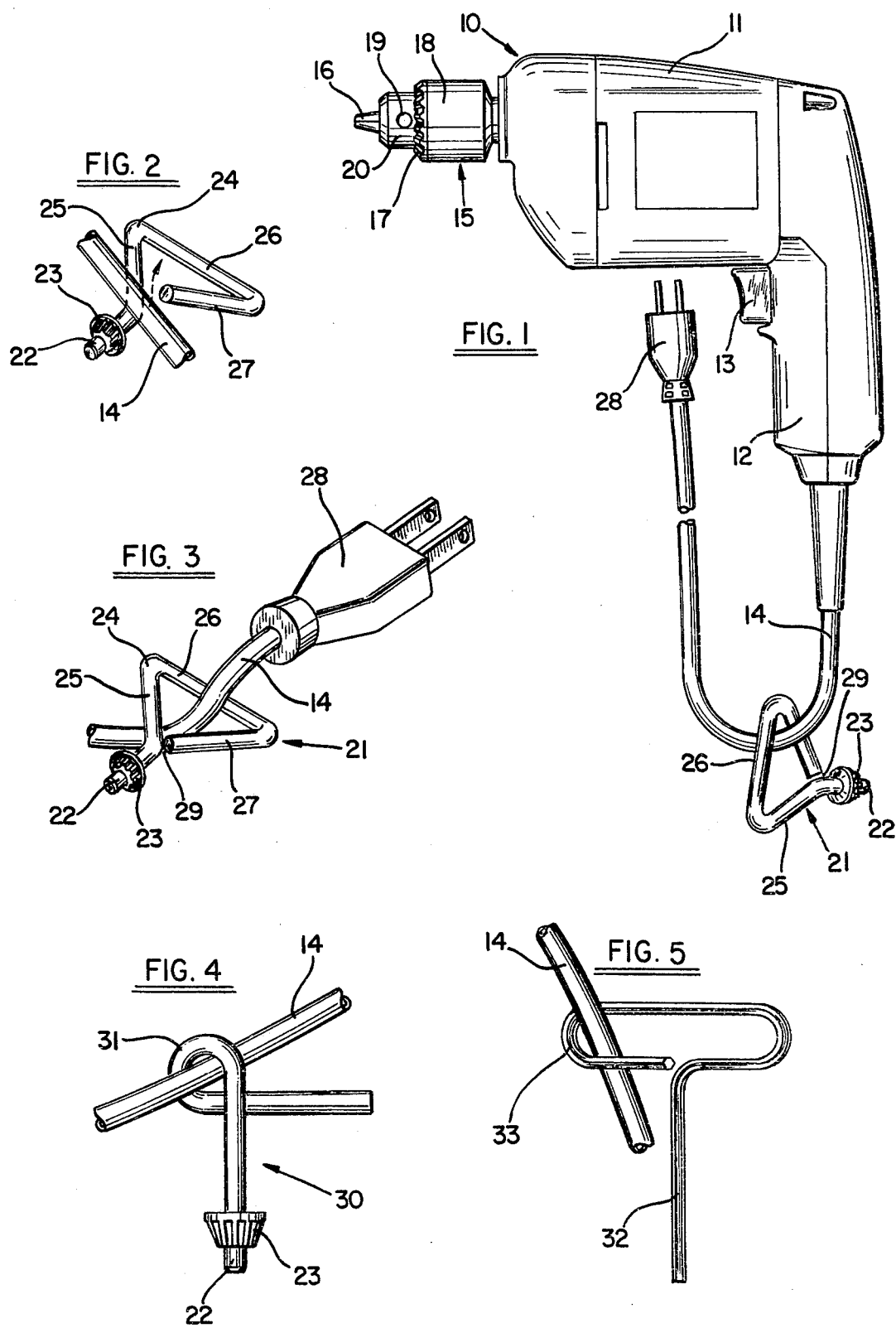

CHUCK KEY

BACKGROUND OF THE INVENTION

In the manufacture of portable electric drills, the chuck key is a seemingly minor element of the system which has been a continuing source of irritation to both the manufacturer and the user. The chuck key is necessary for adequate tightening of the chuck jaws on the shafts of various working implements. However, if the key design is selected so as to permit low cost manufacture, the design is inconvenient for the user. On the other hand, if the design chosen is reasonably convenient for the user, then the manufactured cost is unreasonably high.

A further problem with chuck keys lies in the fact that they must be a separate and freely movable element of the system and cannot be affixed to the drill. Consequently, they are easily lost which can cause substantial inconvenience.

A variety of chuck key constructions have been designed in the past which have solved one or another of these problems. For example, British Pat. No. 560,546, dated Apr. 7, 1944, discloses two versions of a chuck key in which generally wingshaped extensions of the key body are formed integrally therewith to provide a large flat gripping surface which is well suited for use by the operator. However, a chuck key of this design is relatively expensive to manufacture.

Another version of a chuck key is shown in British Pat. No. 1,396,859, dated June 11, 1975. In this design, a generally straight shaft is formed by bending operations to provide an approximation of a T-shape which is relatively inexpensive to manufacture. However, this design is less convenient and less comfortable for the operator to use, particularly if significant force is to be applied to ensure adequate tightening.

Another chuck key design which is still less expensive to manufacture is the widely known and used L-shaped key. This design is basically similar to that of the British Pat. No. 1,396,859 except that the handle portion is bent only once to form an L.

An improved chuck key of simple construction is shown in the recent U. K. Registered Design No. 974,037, issued Oct. 27, 1976. This design is basically similar to the handle illustrated in U.S. Pat. No. 3,213,720, dated Oct. 26, 1965 and also to a variety of similar handles used on such items as Allen wrenches and can opener keys.

Despite the variety of chuck key constructions available in the prior art, a continuing difficulty has been that of ensuring against the loss of the chuck key. The most satisfactory solution to this difficulty for the ultimate user is to tape the key to the cord set of the drill. However, this is not a good solution for the manufacturer and therefore it is not of assistance in preventing loss and theft of keys from the cartons during shipping and distribution.

A further difficulty sometimes encountered is that caused by a careless operator who turns the drill on while the key is in place in the chuck. The key can be thrown out with sufficient force to cause injury or damage.

OBJECTS OF THE INVENTION

It is accordingly a principle object of this invention to provide a simple and secure method of attaching a chuck key to a drill so as to prevent loss or theft thereof.

Another object of this invention is the provision of a chuck key and drill combination which reduces the likelihood that a user will turn the drill on while the key is inserted in the chuck and which limits the distance which the chuck key can be thrown if the drill is turned on.

It is also an object of this invention to provide a structure which reduces the likelihood of loss of tools such as Allen wrenches which are used in association with other corded tools such as jig saws and circular saws.

Further objects of this invention will become apparent as the description and illustration thereof proceed.

DRAWING

In the Figures:

FIG. 1 is a perspective view of a portable electric drill incorporating a chuck key in accordance with the present invention;

FIG. 2 is a perspective view of a chuck key in accordance with the present invention prior to attachment thereof to the drill;

FIG. 3 is a more detailed perspective view of a chuck key attached to a portable electric drill in accordance with the present invention; and FIGS. 4 and 5 are plan views of alternative embodiments of this invention.

DESCRIPTION

In FIG. 1, a portable electric drill 10 is illustrated which, in accordance with conventional practice, comprises a housing 11 having a hand grip 12, a trigger switch 13, a cord 14 and an output chuck 15. An electric motor enclosed within the housing is arranged to be energized by power supplied through the cord when the trigger switch is closed. Activation of the motor causes rotation of the chuck and of a working implement which may be engaged by the chuck.

Also in accordance with conventional design, the chuck 15 is provided with a plurality of jaws 16 for gripping the shaft of a working implement. The jaws may be hand tightened to an initial position in engagement with the shaft of the work implement but in general, a tighter engagement is preferred to prevent slippage. This is accomplished by providing a plurality of gear teeth 17 on the forward edge of the chuck cover 18 and a plurality of pilot holes 19 in the chuck body 20. A chuck key 21 is mounted in the pilot hole and a gear on the chuck key is engaged with the gear teeth 17. Rotation of the chuck key firmly tightens the jaws on the working implement.

The chuck key 21 shown in FIG. 1 and again in more detail in FIG. 3, is provided with a pilot 22 and gear 23 which engage in the conventional manner with the pilot hole 19 and teeth 17 to permit tightening or loosening up of the jaws. In accordance with the present invention, the chuck key 21 is provided with a triangular handle 24 including portions 25, 26 and 27 which form a substantially closed loop. In further accord with this invention, the handle 24 is disposed over the cord 14. This is preferably accomplished by manufacturing the chuck key to an open configuration, for example, as shown in FIG. 2, wherein the portion 27 is bent upwardly leaving an opening. The cord 14 is moved through the opening into the center of the chuck key handle, and then the handle is closed by bending a portion 27 down to complete the key handle. In accordance with this invention, the chuck key handle is sized so that it cannot easily slip over the cord set plug 28 and the handle is closed sufficiently so that the cord set cannot slip out through the small space 29 between the portions 25 and 27.

Several significant advantages are inherent in the chuck key arrangement of this invention. First, it is simple and inexpensive to manufacture since the entire key can be manufactured from a simple rod by cold heading and bending. Heavier duty chuck keys may require somewhat more expense to accommodate harder usage, but manufacture of the handle portion thereof is still of the utmost simplicity.

Secondly, the key configuration provides the advantage of a wide gripping surface which was previously only provided by keys which were relatively expensive to manufacture. The wide rear portion 27 can be fitted into the operator's palm and the side portions 28 and 29 provide a grip surface to be engaged by the operator's fingers.

Thirdly, due to the mounting arrangement of the present invention, the accidental loss of the key is prevented, it is always immediately at hand along the length of the cord set. Directly related to this, the operator is unlikely to activate the tool with the key mounted in the chuck since the cord set will necessarily be folded in front of the handle toward the chuck and will thus provide a clear warning to the operator that the key must be removed. Even if the tool is accidentally actuated the key will be stopped by the cord set within a relatively short distance, thus reducing the likelihood of damage or injury.

FIGS. 4 and 5 illustrate alternative embodiments of this invention. In FIG. 4, an alternative chuck key 30 is illustrated which comprises a rod shaped to define a substantially closed circular loop handle 31 which receives the cord 14. In FIG. 5, an Allen wrench 32 of the type frequently provided for securing jig saw blades or adjusting circular saws is shown which includes a third alternative loop handle 33. In each case, the advantages derived are similar to those previously identified. The respective handles may be initially straight rods formed by bending into the configuration illustrated or they may be cast or otherwise manufactured to their final configuration. In this instance, the cord set is threaded through the loop prior to the installation of the plug, or prior to its connection to the power tool.

While the description and illustration of this invention have been limited to several selected embodiments, it will be clear that other adaptations of this concept to further alternative embodiments may easily be accomplished. For example, with a suitable loop size, a chuck key may be similarly attached to a pneumatic tool. Accordingly, it is intended that the appended claims cover all such changes and modifications as may fall within the true spirit and scope of this invention.

I claim:

1. In a portable electric drill having a housing, an electric motor within said housing, output means comprising a chuck driven by said motor, an electric cord including a plug at one end for supplying power to said motor to rotate said chuck and a chuck key for tightening and loosening said chuck on a working implement, said chuck key comprising a handle and a gear; the improvement wherein said chuck key handle comprises a rod shaped to define a substantially closed loop, said electric cord extending through said loop the diameter of said cord being greater than any opening in said loop and at least one cross sectional dimension of said plug measured in a plane perpendicular to said cord being larger than any internal cross sectional dimension of said loop.

2. Apparatus as claimed in claim 1 wherein said loop is circular.

3. A portable electric drill for driving a working implement comprising a housing; a switch, a motor, and a transmission mounted within said housing; a chuck mounted externally of said housing for rotation by said motor through said transmission, said chuck comprising a plurality of jaws and a tightening gear coupled to said jaws; a cord for supplying power to said motor upon actuation of said switch, said cord comprising an elongated flexible member terminating at one end in a connection means; and a chuck key for driving said gear to tighten and loosen said jaws, said chuck key comprising a gear and a handle attached thereto, said handle being a rod and shaped to define a substantially closed loop; said elongated flexible member extending through said loop the diameter of said flexible member being greater than any opening in said loop and at least one cross sectional dimension of said connection means being larger than the largest internal dimension of said loop.

4. A drill as claimed in claim 3 wherein said loop is triangular.

5. In a portable power tool having a housing, a motor within said housing, output means driven by said motor, and a power cord including a plug at one end for supplying power to said motor to drive said output means, and an adjustable element included in said power tool; the improvement comprising a hand tool for use in adjusting said element of said electric tool, said hand tool having one end arranged to function as a handle and a second end arranged to cooperate with said element of said power tool for adjustment thereof; said handle end being a rod and shaped to define a substantially closed loop enclosing said power cord; the diameter of said cord being greater than any opening in said loop and the internal dimensions of said loop being sufficiently less than the external dimensions of said plug so that said plug cannot pass through said loop.

6. In a portable electric drill having a housing, and electric motor within said housing, output means comprising a chuck driven by said motor, an electric cord including a plug at one end for supplying power to said motor to rotate said chuck, and a chuck key for tightening and loosening said chuck on a working implement, said chuck key comprising a handle and a gear; the improvement wherein said chuck key handle comprises a cylindrical rod extending from the back of said gear, said handle further comprising a substantially closed triangular loop to provide a secure gripping configuration, and wherein said electric cord extends through said loop the diameter of said cord being greater than any opening in said loop and at least one cross sectional area of said plug being larger than the largest internal dimension of said loop.

* * * * *